(12) United States Patent
Kupiec et al.

(10) Patent No.: US 6,766,287 B1
(45) Date of Patent: Jul. 20, 2004

(54) SYSTEM FOR GENRE-SPECIFIC SUMMARIZATION OF DOCUMENTS

(75) Inventors: Julian M. Kupiec, Cupertino, CA (US); Hinrich Schuetze, San Francisco, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/464,213

(22) Filed: Dec. 15, 1999

(51) Int. Cl.[7] .................... G06F 17/27; G06F 15/00; G06F 17/00
(52) U.S. Cl. .................... 704/9; 715/530; 715/531
(58) Field of Search .................... 704/9, 1, 10; 715/500, 715/530, 531

(56) References Cited

U.S. PATENT DOCUMENTS

| | | | |
|---|---|---|---|
| 5,689,716 A | 11/1997 | Chen | 395/761 |
| 5,745,602 A | 4/1998 | Chen et al. | 382/229 |
| 5,778,397 A | 7/1998 | Kupiec et al. | 707/500 |
| 5,838,323 A * | 11/1998 | Rose et al. | 345/349 |
| 5,848,191 A | 12/1998 | Chen et al. | 382/229 |
| 5,918,240 A | 6/1999 | Kupiec et al. | 707/531 |
| 6,349,316 B2 * | 2/2002 | Fein et al. | 707/531 |

OTHER PUBLICATIONS

Goldstein et al. ' "Summarizing Text Document :Sentence Selection and Evaluation Metrics" pp. 1–8, 1999.*

Kessler et al., Automatic Detection of Text Genre, *Proceedings of ACL 35 and EACL 8, Morgan Kaufmann Publishers*, San Francisco, California, 1997, pp. 32–38.

Kupiec et al., A Trainable Document Summarizer, *Proceedings of the 18th Annual International ACM SIGIR Conference on Research and Development in Information Retrieval*, Seattle, Washington, Jul. 9–13, 1995, pp. 68–73.

* cited by examiner

Primary Examiner—Patrick N. Edouard (57) ABSTRACT

A system for genre-specific summarization of documents is provided that overcomes the problem of summarizing heterogeneous document collections by taking the genre, or type, of document into account when selecting summary sentences. The system of the present invention takes advantage of the structure and wording of various document genres to provide faster and more accurate summaries.

26 Claims, 5 Drawing Sheets

SYSTEM FOR GENRE-SPECIFIC SUMMARIZATION OF DOCUMENTS

FIELD OF THE INVENTION

The present invention relates to the field of document management, and more particularly, to a system for summarizing documents that uses information about a document's genre, or document type, for selecting summary sentences for an automatically generated summary.

BACKGROUND

A user faced with a huge document or a collection of documents typically wants to obtain a summary of the documents in order to save time or to answer a specific question. The task of summarizing a document involves finding a small number of sentences that provide a concise characterization of the document. Existing approaches for summarizing documents apply only one summarization strategy, thus ignoring variations in the structure and wording of different genres of documents. Some examples of different document genres include newspaper articles, editorials, reference manuals, scientific works and tutorials. One problem with existing approaches is they can be slow and inaccurate when applied to heterogeneous document collections. A heterogeneous document collection includes documents of different genres, or document types such as fiction, scientific or other non-fiction works, etc.

SUMMARY

The present invention provides a system for genre-specific summarization of documents. The system of the present invention overcomes the problem of summarizing heterogeneous document collections by taking the genre, or type, of document into account when selecting summary sentences. We have discovered that one problem with applying known document summarization techniques to heterogeneous collections is that the assumptions made by such techniques may not apply across the population of the collection. Such assumptions include where in a document sentences which contain summary information might be located, keywords which may indicate summary information, etc. By taking genre into account, the system of the present invention takes advantage of the structure and wording of various document genres to provide faster and more accurate summaries. For example, document genres such as newspaper articles tend to have good summary sentences in the beginning and document genres such as research papers tend to have good summary sentences in the conclusion. The system of the present invention takes this information into account when selecting summary sentences.

BRIEF DESCRIPTION OF THE DRAWINGS

A more complete appreciation of the invention and many of its attendant advantages will be readily obtained and understood by referring to the following detailed description and the accompanying drawings in which like reference numerals denote like elements as between the various drawings. The drawings are briefly described below.

DETAILED DESCRIPTION

An embodiment of the present invention provides a system for summarizing documents that takes advantage of genre-specific characteristics of documents and collections of heterogeneous documents. The system of the present invention performs methods that may be implemented on a computer system having a computer-readable medium and may be performed using computer-executable instructions. The computer-executable instructions may be included in a computer program product. The methods may also include transferring a computer program product from one or more first computers to one or more second computers through a communications medium.

Figure 1:
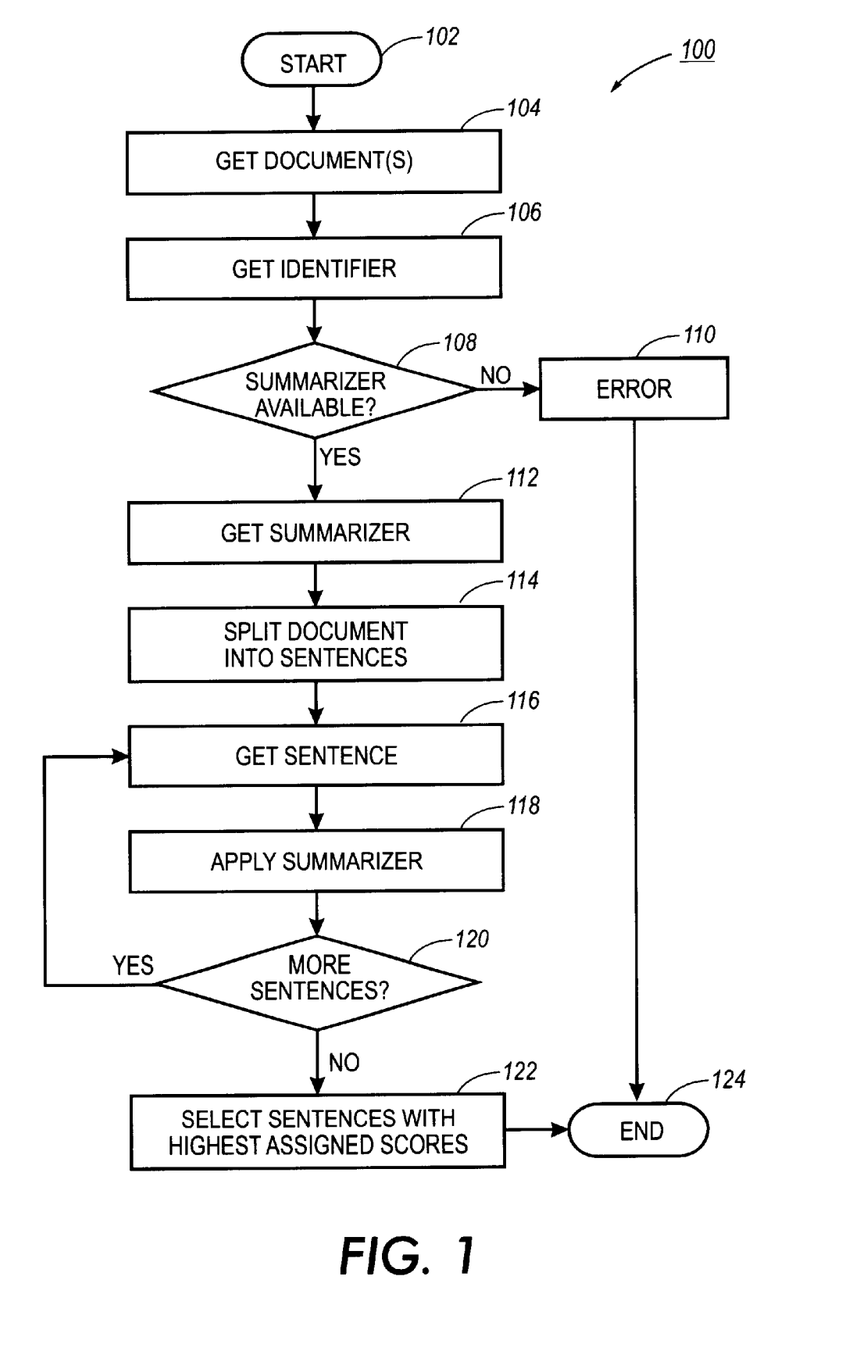
FIG. 1 is a flowchart illustrating steps that are performed in a method for summarizing documents in an embodiment of the present invention.

FIG. 1 is a flowchart 100 illustrating steps that are performed in an example of a method for summarizing documents in an embodiment of the present invention. The method begins, step 102, and the document genre may be determined, step 106. Some examples of document genres include newspaper articles (reportage), editorials, reference manuals, scientific works, technical articles, legal documents, nonfiction, fiction and tutorials. The document genre may be predetermined or determined at the time of summarization. The genre of a document may be determined by observable properties called facets. Some examples of document facets include communication mode (narrative, directive, suasive, descriptive), audience (broadcast, directed), brow (high, medium, low) and authorship (institutional, personal). For a more detailed discussion of facets and genre detection, see Kessler et al., *Automatic Detection of Text Genre*, available on ftp://parcftp.xerox.com/pub/qca/papers/genre, which is herein incorporated by reference. Table 1 shows some examples of how document genres might be identified based on various facets. The genre characteristics of Table 1 are included by way of example only, and are not meant to place any limits on how document genres may be defined and/or identified.

TABLE 1

| Genre | Audience | Authorship | Communication Mode | Brow |
| --- | --- | --- | --- | --- |
| Sci/Tech | directed | institutional | descriptive, narrative | medium–high |
| News | broadcast | institutional | descriptive, narrative | low–high |
| Novel | | personal | narrative | low–high |
| Editorial | directed | personal | suasive | medium–high |
| Legal | directed | personal | suasive | medium–high |
| Manual | directed | institutional | directive | medium |

A determination may then be made as to whether a summarization routine is available for the particular document genre, step 108. If none is available, then the method could optionally flag an error to make the user aware that there is no summarization routine available, step 110, or the method could simply end, step 124.

If a summarization routine is available for the document genre identified in step 106, then that summarization routine might be loaded, step 112. The document may then be split up into sentences, step 114. A sentence may be received, step 116, and analyzed by a genre-specific summarization routine, step 118, by processes that are described further below. The genre-specific summarization routine analyzes the sentence and assigns a score to the sentence, indicating its usefulness as a summary sentence. The assigned score may depend on features of the genre. The probable location of summary sentences is an example of a genre feature. For example, newspaper articles tend to contain summary sentences at the beginning of the document, but technical articles tend to contain summary sentences at the end of the document, or following key phrases such as the words "Conclusion" or "Summary". Genre features are used for characterizing sentences within a document to determine whether or not they are useful for summarizing the document.

Different classifiers may be used for summarizing different document genres. A decision tree as described in, for example, Manning et al., "Foundations of Statistical Natural Language Processing" or Mitchell, "Machine Learning", which are herein incorporated by reference, might be more useful for reportage such as newspaper articles, but a probabilistic classifier, for example as described in the above references might be more useful for fiction.

An example of a document summarization routine is described in more detail below in the discussion of FIGS. 2–4. If there are more sentences available, step 120, then the next sentence may be received, step 116, and processed by the genre-specific summarization routine, step 118, until all of the sentences in the document have been analyzed and scored. After all of the sentences in the document have been analyzed, the sentences with the assigned scores that are the most consistent with a set of criteria that indicate which sentences make good summary sentences, may be selected as summary sentences, step 122, and processing may end, step 124. In an example of an embodiment of the present invention, sentences that are most likely to be summary sentences may be weighted more heavily than other sentences, and may receive higher assigned scores. (Lower assigned scores might also be used for indicating good summary sentences, depending on how the system for rating sentences as summary sentences is implemented.) The sentences having the highest assigned scores are then selected as summary sentences. A cut-off threshold for the assigned score may be selected to limit the number of sentences that are selected as summary sentences. For example, a user may select a criterion such as selecting the n highest-scoring sentences. The value of n may be a fixed value, e.g. n=5 or n may be variable. Such a threshold could be determined for example, by the genre of the document, by the length of the sentence, or by the position of the sentence within a paragraph or within the document. Other factors may also be considered in determining a cut-off threshold. The threshold may be preset or may be dynamically determined by, for example, the computer system. Also, sentences that are the most likely to be summary sentences may be weighted lower than other sentences, and receive lower assigned scores.

Figure 2:
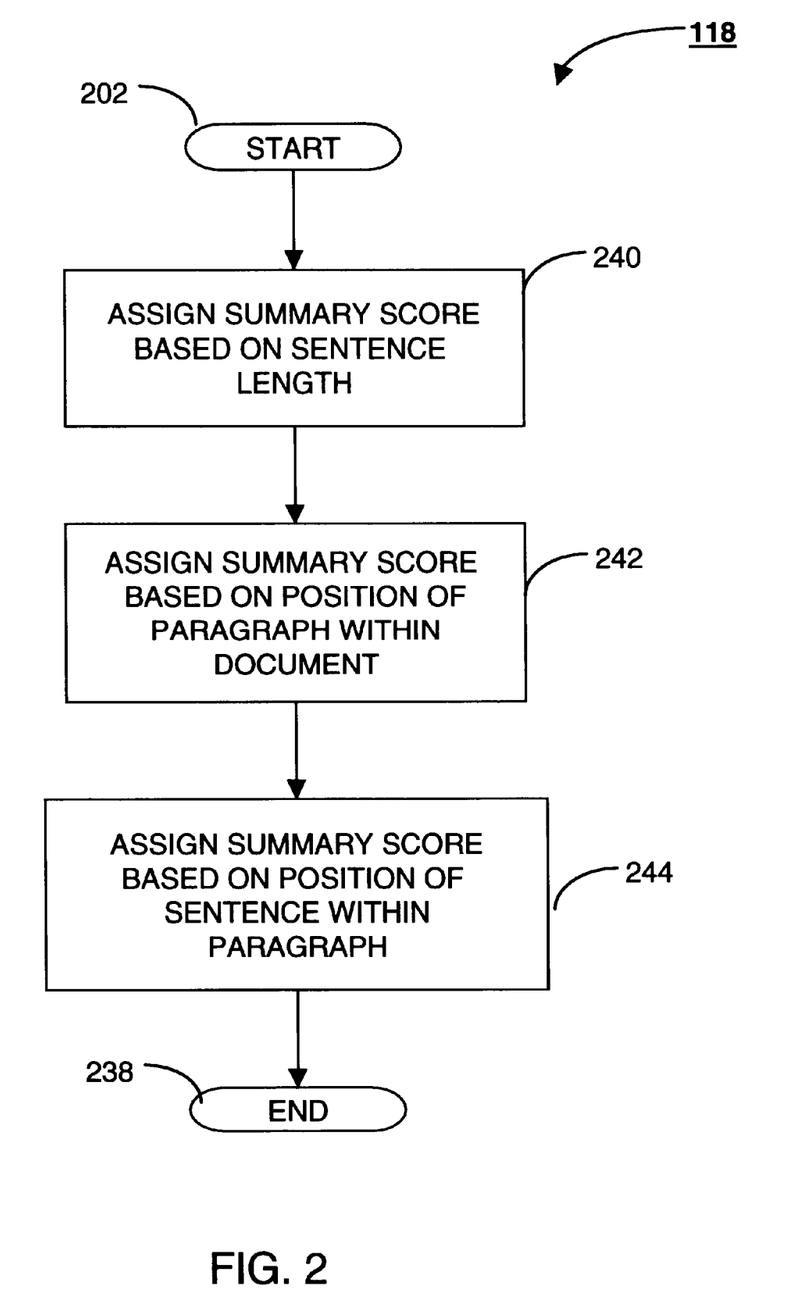
FIG. 2 is a flowchart illustrating steps that are performed in a method for applying a genre-specific summarizer in another embodiment of the present invention.

FIG. 2 is a flowchart 200 illustrating an example of steps that may be performed in a method for applying a genre-specific summarizer in an embodiment of the present invention. The method of flowchart 200 begins, step 202, during processing of the method shown in flowchart 100 in FIG. 1, after step 116, where a sentence may be received. A summary score may be assigned to the sentence being processed based on, for example, the sentence length, step 240. Other criteria may also be applied to apply summary scores to a sentence, for example the average word length of a sentence. A summary score might then be assigned to the sentence based on the position of the paragraph containing the sentence being processed within the document or set of documents being analyzed or summarized, step 242. A summary score might also be assigned based on the sentence position within in a paragraph, step 244. Other summary scores may also be assigned at this point, such as for use of keywords, etc.

Continuous representations of the input may also be used to determine summary scores for each sentence. For example, the first sentence in a paragraph containing five sentences might contain a paragraph position score of ⅕= 0.2. Similarly, the third sentence in a paragraph containing eight sentences might be assigned a paragraph position score of ⅜=0.375. The scores from the evaluations of sentence length, average word length per sentence, sentence position within a paragraph, etc. are later combined to produce an overall score for the sentence. From the overall scores for each sentence, a composite score might be created for each sentence and the sentences having the highest composite score are selected in step 122, described above in FIG. 1. The above scoring method is given by way of example, but it should be noted that any scoring method could be used.

For additional information on scoring methods that may be used, see Kupiec et al., U.S. Pat. No. 5,778,397, "Automatic Method of Generating Feature Probabilities for Automatic Extracting Summarization"; Kupiec et al., U.S. Pat. No. 5,918,240, "Automatic Method of Extracting Summarization Using Feature Probabilities"; Chen et al., U.S. Pat. No. 5,745,602, "Automatic Method of Selecting Multi-Word Key Phrases from a Document"; Chen, U.S. Pat. No. 5,689, 716 "Automatic Method of Generating Thematic Summaries"; and Kupiec et al., "A Trainable Document Summarizer", Proceedings of SIGIR 95, pp. 68–73, 1995, which are herein incorporated by reference.

Figure 3:
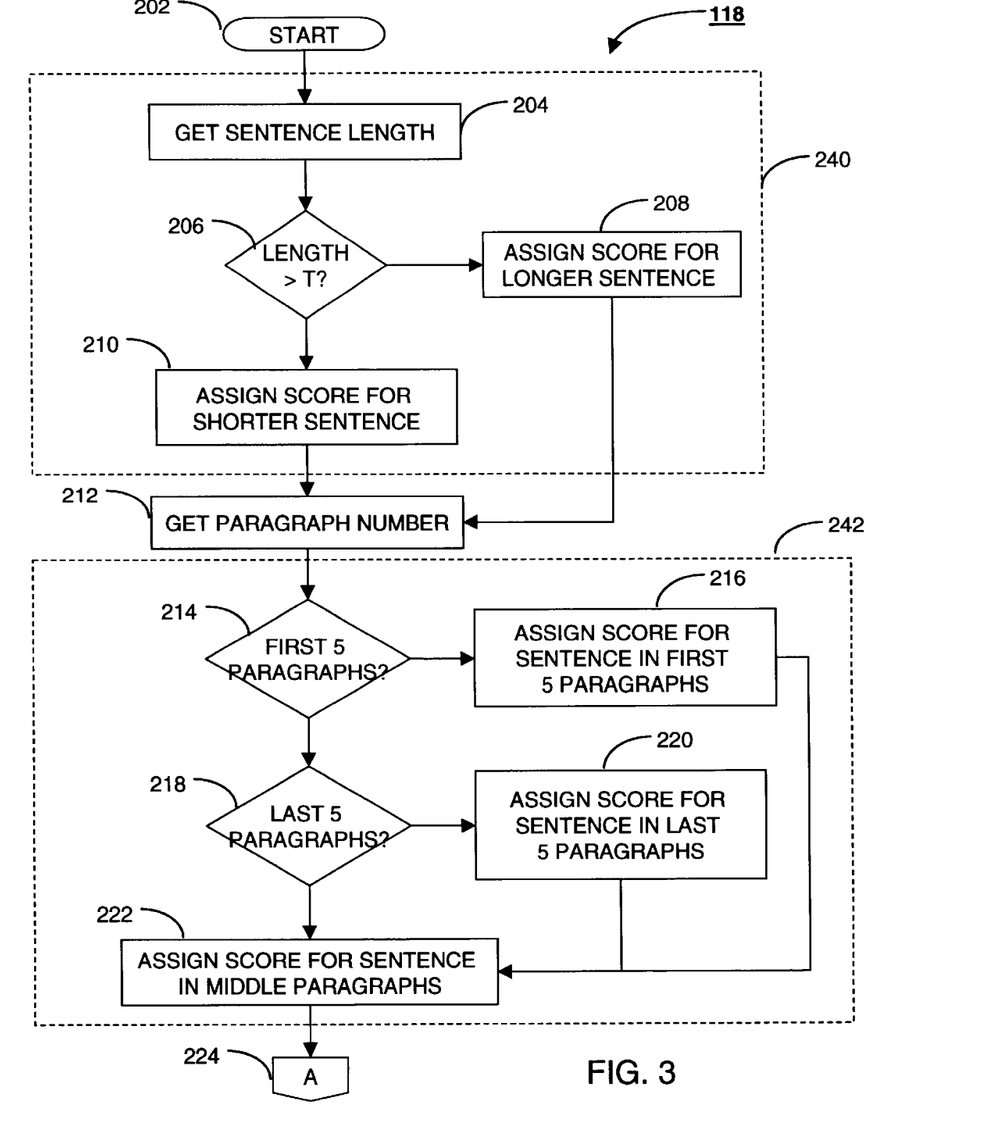
FIG. 3 is a flowchart illustrating steps that are performed in a method for applying a genre-specific summarizer in yet another embodiment of the present invention.

FIG. 3 is a flowchart 300 illustrating an example of steps that may be performed in a method for applying a genre-specific summarizer in an embodiment of the present invention. The method of flowchart 300 might begin, step 202, during processing of the method shown in flowchart 100 in FIG. 1, after step 116, where a sentence might be received. Steps 204–210, indicated by dotted-line block 240, assign a summary score to the sentence being processed based, for example, on the sentence length. The length of the sentence is determined, step 204, and may be compared to a threshold T, step 206. Any appropriate threshold may be used, but it is preferably a value indicating a threshold length that provides information as to whether the sentence is more likely or less likely to be a summary sentence. This threshold length may be predetermined and input, obtained from another source, determined dynamically, etc. A length factor may be assigned based on the comparison of the length of the sentence to the threshold. If the length factor is greater than the threshold, then a summary score may be assigned based on a sentence that is longer, or greater in length, than the threshold in step 208. Processing may then continue at step 212, described below. If the length factor is less than or equal to the threshold, then a summary score may be assigned based on a sentence that is shorter than or the same length as the threshold in step 210. Processing may then continue at step 212, described below.

Steps 212–222, indicated by dotted-line block 242, assign a summary score based on the position of the paragraph containing the sentence being processed within the document or set of documents being analyzed or summarized. A paragraph position factor may be assigned, indicating where the paragraph lies within the document or set of documents. The paragraph position factor may be compared to a threshold, and depending on the result of the comparison, the sentence may be scored appropriately. In an example, if the paragraph falls within the first five paragraphs of the document in step 214, it is processed as an initial paragraph, as in step 216. If the paragraph falls within the last five paragraphs of the document in step 218, then it may be processed as an ending paragraph, as in step 220. Otherwise, the paragraph may be assumed to lie somewhere between the first five paragraphs and the last five paragraphs of the document and may be assigned a score reflecting that position in step 222. Processing may continue, as shown by continuation indicator A, step 224, from FIG. 3 to FIG. 4.

Figure 4:
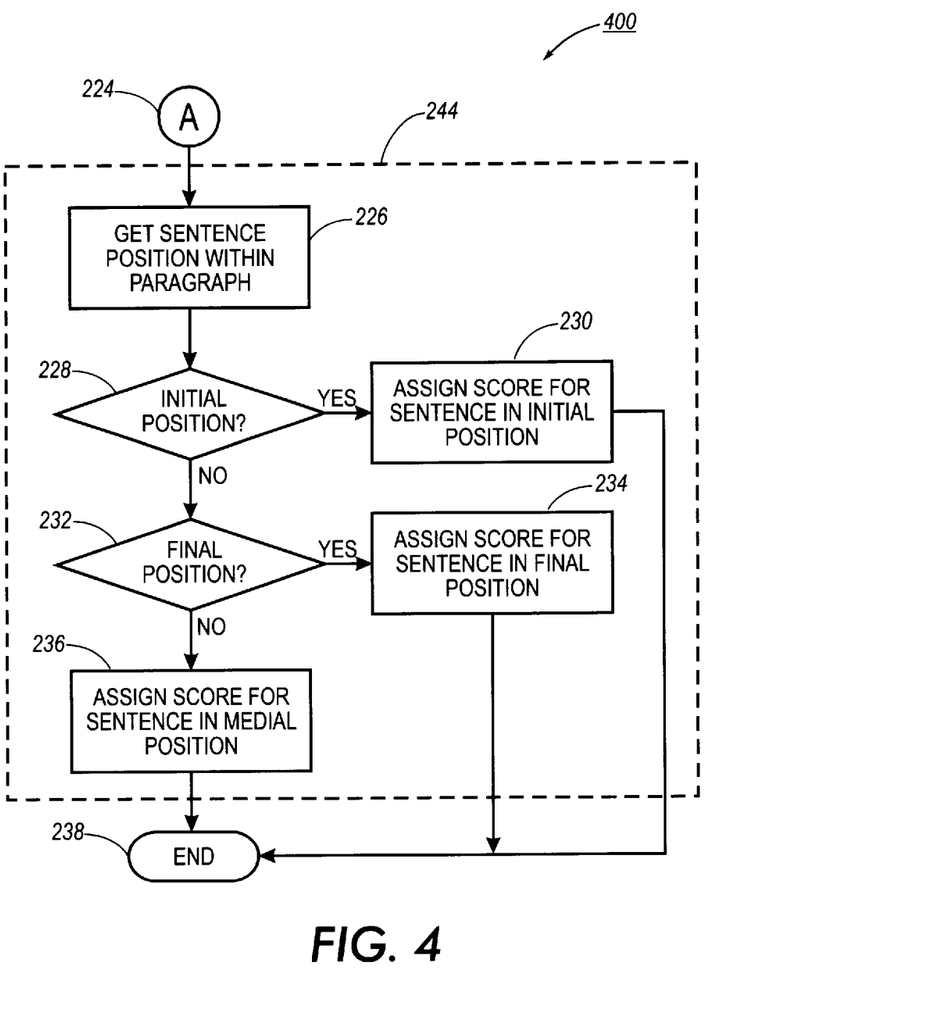
FIG. 4 is a flowchart illustrating a continuation from the flowchart of FIG. 3.

FIG. 4 is a continuation of flowchart 400 from FIG. 3, illustrating steps that may be performed in a method for summarizing documents in an embodiment of the present invention. Steps 226–236, indicated by dotted-line block 244, assign a summary score based on where the sentence being processed falls within a paragraph. A sentence position factor may be assigned, indicating where the sentence lies in the paragraph. The sentence position factor may be compared to a threshold, and depending on the result of the comparison, the sentence may be scored appropriately. The position of a sentence within the paragraph may be determined, step 226, and then a summary score may be assigned based on the position of the sentence within the paragraph. If the sentence is near the beginning of the paragraph, step 228, then a summary score may be assigned based on that determination in step 230 and processing may end at step 238. If the sentence is near the end of the paragraph, step 232, then a summary score may be assigned based on that determination in step 234 and processing may end at step 238. Otherwise, the sentence may be assumed to be in or near the middle of the paragraph, i.e., not in an initial position at the beginning of the paragraph, or in a final position at the end of the paragraph. If the sentence is in a medial position, somewhere in or near the middle of the paragraph, then a summary score may be assigned based on that determination in step 236. Processing may then end at step 238.

It should be noted that the group of steps 204–210 (block 240), the group of steps 212–222 (block 242), and the grouping of steps 226–236 (block 244) might be performed in any order relative to each other, or with intervening steps. Also, depending on how the document genre is characterized in terms of which sentences make good summary sentences, it may not be necessary to process all of the groups of steps to obtain an assigned score.

Figure 5:
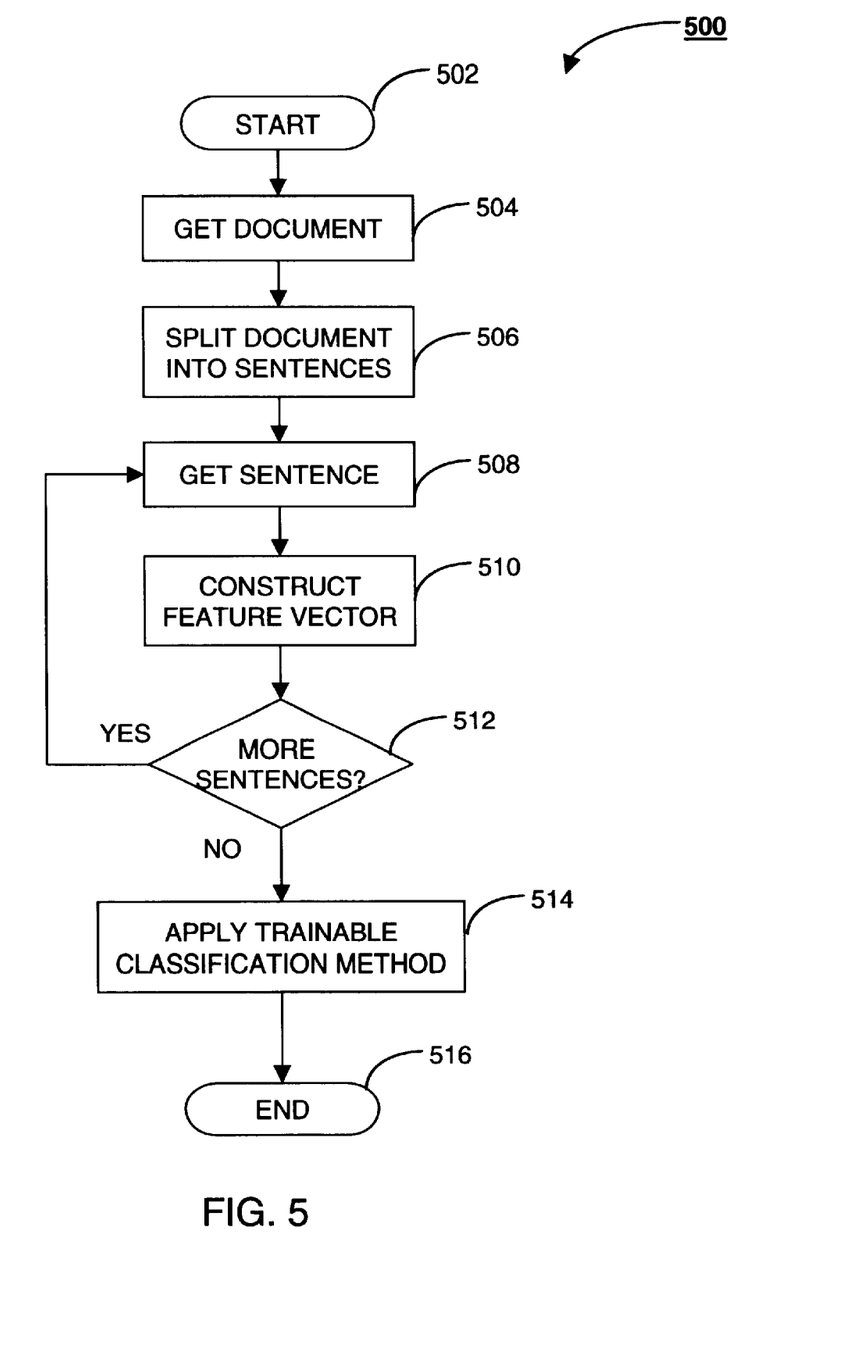
FIG. 5 is a flowchart illustrating steps that are performed in a method for summarizing documents in an embodiment of the present invention employing a feature vector.

FIG. 5 is a flowchart 500 illustrating steps that may be performed in a method for summarizing documents in an embodiment of the present invention. In the embodiment shown by flowchart 500, instead of using a genre-specific summarizer, a feature vector may be created for each sentence. The feature vector may take characteristics of genre into account but does not require that the genre be predetermined. This embodiment is useful for documents or collections of documents for which the genre is not known or determinable prior to applying the summarizer. The method begins, step 502, and at least one document may be received, step 504. The document may be split up into sentences, step 506, and each sentence may be analyzed, steps 508–513. A sentence may be received, step 508, and a feature vector may be constructed, step 510, as will be described further below.

A single feature vector may contain information on the standard summarization features of the sentence. An example of a feature vector for a sentence is as follows. Assume that a position value of 0.0 is assigned to a sentence or a paragraph having a position near the beginning, and that a position value of 1.0 is assigned to a sentence or paragraph near the end. For example, a value of 0.0 might be assigned to a sentence having a position at the beginning of a paragraph, or to a paragraph having a position at the beginning of a document. Similarly, a value of 1.0 might be assigned to a sentence having a position at the end of a paragraph, or to a paragraph having a position at the end of a document. A feature vector for a sentence might include the following values: position in paragraph is 0.375, indicating that the sentence is ⅜ away from the beginning of the paragraph; position of paragraph in document is 1.0, indicating that the paragraph is as the end of the document; and average word length is 7.8, indicating the average number of words in a sentence. (See score for Sentence 4 in Table 2 below.)

A single feature vector may also be concatenated with genre-identification features that pertain to the document as a whole in order to create a composite feature vector that may provide genre-specific summarization when used with any trainable classification method, described in more detail below. An example of the contents of a feature vector for a sentence (see sentence 5 in Table 2 below) with genre features concatenated is as follows: position in paragraph is 0.5; position of paragraph in document is 1.0; average word length is 7.8; average number of punctuation marks is 0.05; average number of latinate endings is 0.21; and average word length of document is 6.9.

Table 2 shows an example of how feature vectors might be defined. The first column indicates which sentence is being examined. The second, third and fourth columns indicate the scores for Feature 1, Feature 2, and Feature 3 respectively. Feature 1 is the position of a sentence within a paragraph, feature 2 is the position of the paragraph in the document, and feature 3 is the average word length for the sentence. More or less features may be included in a feature vector as appropriate. The last column ("Score") indicates the total score when the three features values associated with a particular sentence are added up. (For example, the score for sentence n, referred to as Fn in Table 2 below, would be Fn=F1+F2+F3.) In an example embodiment of the present invention, a document summary may be obtained by selecting the sentences having the highest scores. The feature vectors described in Table 2 are included by way of example only, and are not meant to place any limits on feature vectors might be defined and/or identified.

TABLE 2

| Sentence | Feature 1 | Feature 2 | Feature 3 | Score |
| --- | --- | --- | --- | --- |
| 1 | 0.375 | 0.0 | 7.8 | 8.175 |
| 2 | .5 | 0.3 | 8.0 | 8.8 |
| 3 | 1.0 | .5 | 4.0 | 6.0 |
| 4 | 0.375 | 1.0 | 7.8 | 9.175 |
| 5 | .5 | 1.0 | 7.8 | 9.3 |
| n | F1 | F2 | F3 | Fn |

A determination is made as to whether there are more sentences to process, step 512. If there are more sentences, then processing may continue at step 508. Otherwise, if there are no more sentences to process, processing may continue to step 514 where a trainable classification method may be applied to the feature vectors obtained in step 510 to determine which sentences are summary sentences. After classification, the method may end, step 516.

Examples of trainable classification methods that may be used in step 514 include, but are not limited to, classification methods that take binary features or feature vectors as input and classification methods that take continuously valued features and vectors as input. Classification methods that take binary features or feature vectors include decision trees and Bayesian classifiers. For example, a decision tree in which splits on the genre features are interleaved with splits on the summarization features may be used in an embodiment of the present invention. A second-order Bayesian classifier in which the probability of a summary feature value may be conditioned on the value of one of the genre features may also be used. For more details on decision trees and other probabilistic classifiers, see Manning et al. and Mitchell, incorporated by reference above.

Classification methods that use continuous features may include, for example, logistic regressions, neural networks and other gradient descent learning algorithms. A classification method can be formalized as a function mapping from feature vectors (elements of R^n) to probabilities. Note that classification methods based on binary features are a special case of classification methods based on continuous features. A binary distinction is between yes and no. This can be represented as two different numbers; for example 0.0 and 1.0, to indicate zero possibility vs. certainty, as described above in the above examples relating to feature vectors. However, any other pair of distinct numbers may be used to reflect a binary distinction, for example −1 and +1.

While the embodiments of the present invention described herein have focused on genre-specific summarization featuring specific examples of genre summarizing criteria and trainable classification methods, other summarizing criteria and trainable classification methods could be used without departing from the spirit and scope of the present invention. Thus, it should be appreciated that the above description is merely illustrative, and should not be read to limit the scope of the invention or the claims.

What is claimed is:

1. A computer-implemented method for summarizing a document comprising:
   receiving a document included in a heterogeneous document collection having a plurality of document genres; the document including a plurality of sentences;
   determining a genre of said document at the time of summarization of said document;
   selecting a sentence from said document;
   applying a genre-specific summarization routine to said sentence, said summarization routine including at least one genre-specific document feature; said summarization routine evaluating said sentence using the at least one genre-specific document feature to produce a feature value; evaluation of the feature value being dependent at least in part on the genre of said document;
   assigning a summary score to the sentence based on the feature value produced by the summarization routine; and
   selecting said sentence as a summary of the document if the summary score for the sentence is above a threshold value.

2. The computer-implemented method of claim 1, wherein applying a genre-specific summarization routine includes constructing at least one feature vector for the sentence, wherein the feature vector indicates a summary score.

3. The computer-implemented method of claim 1, wherein the at least one genre-specific document feature is a sentence length feature having a value indicating whether the sentence is one of greater than, equal to and less than a sentence length threshold value dependent on the document genre.

4. The computer-implemented method of claim 1, wherein the document includes a plurality of paragraphs, and wherein the at least one genre-specific document feature is a paragraph position feature representing a paragraph position within the document of a paragraph containing the sentence, the paragraph position feature having a value indicating the paragraph position in the document as defined by a paragraph threshold value dependent on the document genre.

5. The computer-implemented method of claim 1, wherein the document includes a plurality of paragraphs, and wherein the at least one genre-specific document feature is a sentence position feature representing sentence position within a paragraph containing the sentence, the sentence position feature having a value indicating the sentence position in the paragraph as defined by a sentence threshold value dependent on the document genre.

6. The computer-implemented method of claim 1, wherein the at least one genre-specific document feature is one of a plurality of document features including
   a sentence word length feature having a value indicating an average word length of words in the sentence;
   a document word length feature having a value indicating an average word length of words in the document; and
   a punctuation mark feature having a value indicating a number of punctuation marks in the sentence.

7. A computer-implemented method for summarizing documents included in a heterogeneous document collection having a plurality of document genres, each document containing a plurality of sentences, the method comprising:
   constructing a feature vector for a sentence in a document, wherein the feature vector includes a plurality of document summarization features and a plurality of genre identification features; constructing the feature vector including analyzing the sentence to determine a value for each feature; the values of the feature vector indicating a summary score that includes genre-specific information; and
   applying a trainable classification procedure to the feature vectors constructed for sentences in the document to select a plurality of sentences using the summary scores, wherein the selected sentences summarize the document.

8. The method of claim 7, wherein the trainable classification procedure is a decision tree in which splits on genre features can be interleaved with splits on summarization features.

9. The method of claim 7, wherein the trainable classification procedure is a second-order Bayesian classifier in which the probability of a document summarization feature value is conditioned on the value of one of the genre identification features.

10. The method of claim 7, wherein the trainable classification procedure is a logistic regression.

11. The method of claim 7, wherein the trainable classification procedure is a neural network.

12. A computer system of a type having a processor, a display, and a memory, the memory including an operating environment, and a computer-readable medium having computer-executable instructions for performing a method of summarizing a document, the system comprising:
   computer-executable instructions for receiving a document included in a heterogeneous document collection having a plurality of document genres; the document including a plurality of sentences;

computer-executable instructions for determining a genre of said document at the time of summarization of said document;

computer-executable instructions for selecting a sentence from said document;

computer-executable instructions applying a genre-specific summarization routine to said sentence, said summarization routine including at least one genre-specific document feature; said summarization routine evaluating said sentence using the at least one genre-specific document feature to produce at least one feature value; evaluation of the feature value being dependent at least in part on the genre of said document;

computer-executable instructions for assigning a summary score to the sentence based on the feature value produced by the summarization routine; and computer-executable instructions for selecting said sentence as a summary of the document if the summary score for the sentence is above a threshold value.

13. The computer system of claim 12, wherein the computer-executable instructions for applying a genre-specific summarization routine include constructing at least one feature vector for the sentence, wherein the feature vector indicates a summary score.

14. The computer system of claim 12, wherein the at least one genre-specific document feature is a sentence length feature having a value indicating whether a sentence is one of greater than, equal to and less than a sentence length threshold value dependent on the document genre.

15. The computer system of claim 12, wherein the document includes a plurality of paragraphs, and wherein the at least one genre-specific document feature is a paragraph position feature representing a paragraph position within the document of a paragraph containing the sentence, the paragraph position feature having a value indicating the paragraph position in the document as defined by a paragraph threshold value dependent on the document genre.

16. The computer system of claim 12, wherein the document includes a plurality of paragraphs, and wherein the at least one genre-specific document feature is a sentence position feature representing sentence position within a paragraph containing the sentence, the sentence position feature having a value indicating the sentence position in the paragraph as defined by a sentence threshold value dependent on the document genre.

17. The computer system of claim 12, wherein the at least one genre-specific document feature is one of a plurality of document features including a sentence word length feature having a value indicating an average word length of words in the sentence;

a document word length feature having a value indicating an average word length of words in the document; and a punctuation mark feature having a value indicating a number of punctuation marks in the sentence.

18. A computer system having a processor, a display and memory, the memory including an operating environment, and a computer-readable medium having computer-executable instructions for performing a method of summarizing a document included in a heterogeneous document collection having a plurality of document genres, each document containing a plurality of sentences, the method comprising:

constructing at least one feature vector for a sentence in a document, wherein the feature vector includes a plurality of document summarization features and a plurality of genre identification features; constructing the feature vector including analyzing the sentence to determine a value for each feature; the values of the feature vector indicating a summary score that includes genre-specific information; and applying a trainable classification procedure to the feature vectors constructed for sentences in the document to select a plurality of sentences using the summary scores, wherein the selected sentences summarize the document.

19. The computer system of claim 18, wherein the trainable classification procedure is a decision tree in which splits on genre features can be interleaved with splits on summarization features.

20. The computer system of claim 18, wherein the trainable classification procedure is a second-order Bayesian classifier in which the probability of a document summarization feature value is conditioned on the value of one of the genre identification features.

21. The computer system of claim 18, wherein the trainable classification procedure is a logistic regression.

22. The computer system of claim 18, wherein the trainable classification procedure is a neural network.

23. A computer program product having a computer-readable medium holding computer-executable instructions for performing a method of summarizing a document comprising:

computer-executable instructions for receiving a document included in a heterogeneous document collection having a plurality of document genres; the document including a plurality of sentences;

computer-executable instructions for determining a genre of said document at the time of summarization of the document;

computer-executable instructions for selecting a sentence from said document;

computer-executable instructions for applying a genre-specific summarization routine to said sentence, said summarization routine including at least one genre-specific document feature; said summarization routine evaluating said sentence using the at least one genre-specific document feature to dependent produce at least one feature value; evaluation of the feature value being at least in part on the genre of said document;

computer-executable instructions for assigning a summary score to the sentence based on the feature value produced by the summarization routine; and computer-executable instructions for selecting said sentence as a summary of the document if the summary score is above a threshold value.

24. A computer program product having a computer-readable medium holding computer-executable instructions for performing a method for summarizing a document included in a heterogeneous document collection having a plurality of document genres, the document including a plurality of sentences, the method comprising:

constructing a feature vector for each sentence, wherein the feature vector includes a plurality of document summarization features and a plurality of genre identification features; constructing the feature vector including analyzing the sentence to determine a value for each feature; the values of the feature vector indicating a summary score that includes genre-specific information; and applying a trainable classification procedure to the feature vectors constructed for sentences in the document to select a plurality of sentences using the summary scores, wherein the selected sentences summarize the document.

25. A method for transferring a computer program product from one or more first computers to a second computer connected to the one or more first computers through a communications medium, comprising:
(a) accessing, on the one or more first computers, computer-executable instructions, which when executed by a computer, perform the steps of:
 (1) receiving a document included in a heterogeneous document collection having a plurality of document genres and determining a genre of the document at the time of document summarization, the document including a plurality of sentences;
 (2) selecting a sentence from said document;
 (3) applying a genre-specific summarization routine to said sentence, said summarization routine including at least one genre-specific document feature; said summarization routine evaluating said sentence using the at least one genre-specific document feature to produce at least one feature value; evaluation of the feature value being dependent at least in part on the genre of said document;
 (4) assigning a summary score to the sentence based on the feature value produced by the summarization routine; and
 (5) selecting said sentence as a summary of the document if the summary score for the sentence is above a threshold value; and
(b) transferring the computer-executable instructions from the one or more first computers to the second computer through the communications medium.

26. A method for transferring a computer program product from one or more first computers to a second computer connected to the one or more first computers through a communications medium, comprising:
(a) accessing, on the one or more first computers, computer-executable instructions, which when executed by a computer, perform the steps of:
 (1) constructing a feature vector for a sentence in a document included in a heterogeneous document collection having a plurality of document genres, the document containing a plurality of sentences, wherein the feature vector includes a plurality of document summarization features and a plurality of genre identification features; constructing the feature vector including analyzing the sentence to determine a value for each feature; the values of the feature vector indicating a summary score that includes genre-specific information; and
 (2) applying a trainable classification procedure to the feature vectors constructed for sentences in the document to select a plurality of sentences using the summary scores, wherein the selected sentences summarize the document; and
(b) transferring the computer-executable instructions from the one or more first computers to the second computer through the communications medium.

* * * * *